Figure 1:
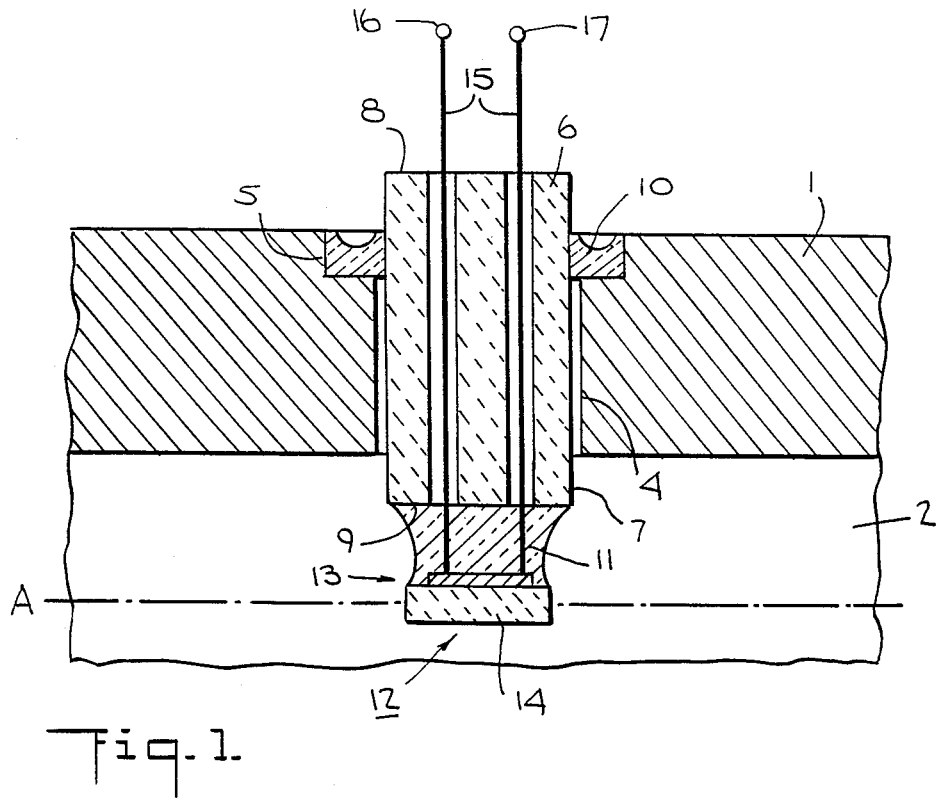

United States Patent [19]

Wiegleb et al.

[11] Patent Number: 4,972,708

[45] Date of Patent: Nov. 27, 1990

[54] THERMAL MASS FLOW-METER PARTICULARLY FOR GASES

[75] Inventors: Gerhard Wiegleb, Maintal; Helmut Heimel, Ronneburg; Rudi Röss, Bruchköbel, all of Fed. Rep. of Germany

[73] Assignee: Leybold Aktiengesellschaft, Hanau, Fed. Rep. of Germany

[21] Appl. No.: 370,397

[22] Filed: Jun. 22, 1989

Related U.S. Application Data

[63] Continuation of Ser. No. 573,133, Jan. 20, 1984, abandoned.

[30] Foreign Application Priority Data

Jan. 22, 1983 [DE] Fed. Rep. of Germany ....... 3302080

[51] Int. Cl.$^5$ ............................................... G01F 1/68
[52] U.S. Cl. ........................... 73/204.22; 73/204.26; 338/28
[58] Field of Search ........... 73/204.22, 204.25, 204.26, 73/204.27; 338/22 R, 25, 28

[56] References Cited

U.S. PATENT DOCUMENTS 2,802,925 8/1957 Seelen et al. ........................... 338/28
3,363,462 1/1968 Sabin ..................................... 73/204
3,900,819 8/1975 Djorup ........................ 73/204.26 X

FOREIGN PATENT DOCUMENTS 2475724 8/1981 France ................................... 338/28
100966 8/1920 United Kingdom ................. 73/204
1454816 11/1976 United Kingdom ................. 338/28

Primary Examiner—Herbert Goldstein
Attorney, Agent, or Firm—Felfe & Lynch

[57] ABSTRACT

A thermal mass flow-meter used in particular for corrosive and hot gases. It includes a flow duct having at least two measuring resistors. At least one of these is arranged in the flow cross-section. At least one heat source is provided in the zone of influence of the measuring resistors; heat source and measuring resistance may be identical. For the purpose of obtaining long-term resistance to corrosion accompanied by great sensitivity as regards response, the measuring resistors consist of a thin-film resistor with a ceramic insulating member, a measuring resistor is connected to a ceramic support member by way of glass solder, and the support member is in turn connected to the flow duct by way of a glass solder element.

2 Claims, 4 Drawing Sheets

THERMAL MASS FLOW-METER PARTICULARLY FOR GASES

This is a continuation application of application Ser. No. 573,133, filed Jan. 20, 1984, now abandoned.

The invention concerns a thermal mass flow-meter particularly for gases, and consisting of a flow duct, comprising at least two temperature-dependent measuring resistors which are exposed to the flow medium and at least one of which is arranged in the flow cross-section, and comprising at least one heat source arranged in the zone of influence of the measuring resistors, the flow-meter also consisting of an analyzing circuit for converting the resistance values into amounts proportional to flow.

The measuring principle upon which mass flow-meters of this kind operate can also be called the "Anemometer Principle". Hitherto, however, this measuring principle has been used exclusively for measuring flow rates in practically pure gases at low gas temperatures.

The paper "Reverse flow sensing hot wire anemometer" published in the Journal of Physics and Scientific Instruments vol. 5, August/September 1972, pages 849 to 852, disclosed an anemometer of this kind wherein two thin wires having temperature-dependent resistance are stretched in the direction of flow at each side of a hot wire. In motionless gas, the two measuring resistors heat up uniformly under the effect of the hot wire, so that the indication is zero. However, this condition of stability dangers when the gas begins to flow. The measuring principle is based on the fact that the measuring resistor, disposed upstream, is relatively cooled by the gas flow, whereas the measuring resistor, disposed downstream, is additionally heated up by the transfer of heat from the hot wire. The difference in resistance can be converted in an analyzing circuit into an amount proportional to the rate of flow. For this purpose, use is generally made of a bridge circuit, the details of which are likewise described in the above-mentioned paper.

The use of the anemometer principle for the measurement of leaks is disclosed in US-PS 2 645 117. Two thin wires having temperature-dependent resistance and heated by the passage of heat directly therethrough are fitted in different chambers formed in a measuring block. One of the chambers receives the gas flow that is to be measured, whereas a motionless gas atmosphere is present in the other chamber for determining a reference value. In this instance too, the detuning of a bridge circuit is used for producing a measured value or indication value. US-PS 2 509 889 discloses a differential altimeter for aircraft which operates on the anemometer principle and comprises two thermistors which are arranged at each side of a heating resistor in the direction of flow and the temperature levels of which change from the steady condition under the acting of flow. Here again, the flow rate is determined from the difference between the resistance values with the aid of a bridge circuit.

It is also known to use thermocouple elements instead of measuring resistors or thermistors (DE-AS 20 52 645).

All known anemometers, however, have suffered from the disadvantage that they could be used only in a very pure or at least almost pure gas atmosphere at a relatively low temperatures (e.g. the surrounding air), since otherwise they would be rapidly destroyed.

If flow-meters for high temperatures (above 500 K) and for very corrosive gases (acid vapours, chlorine gas, etc.) were required, what are called floating-body flow-meters have hitherto been used. These consist of a tube having a slight interior taper in which a spindle-like floating body is carried by the flowing gas. Depending upon the level of the floating body and as a result of the tapering of the tube, an annular gap of varying size is exposed, so that the level of the floating body serves as a measure for the amount of flow. Although flow-meters of this kind permit a satisfactorily accurate optical indication, the generation of electrical signals proportional to the flow is difficult to achieve. The known flow-meters of this kind are therefore provided only with limit-value contacts involving an optical or inductive basis.

Flow-meters that are constructed in accordance with the Doppler principle (optical or acoustic) are generally very complicated as regards the necessary electronic processing of signals, so that because of the associated high cost they are used only for special measurements, for example, for Laser-Doppler measurements in flames.

Many efforts have therefore been made to apply the anemometer principle also in the measurement of mass flow in the case of corrosive gases and/or high-temperature gases.

Thus, for example, a publication issued by Messrs. Brooks (USA) entitled "Thermal Mass Flow Meters" described a flow duct with a heating resistor wound around its median zone and with two measuring resistors wound around the duct at each side of the heating resistor in the direction of flow. Particularly in the case of measuring corrosive gases, surfaces that come into contact therewith are either of stainless steel or of a correspondingly resistant plastics material. In the case of motionless gas, the same amount of heat flows from the heating resistor to the two measuring resistors, so that the latter acquire the same temperature. However, as the rate of flow increases, the duct is cooled in the zone of the upstream measuring resistor and is additionally heated in the zone of the downstream measuring resistor. In this instance too, the difference between the resistance values constitutes a measure for the mass flow.

Although the above-mentioned commercial publication speaks of prompt response, this known apparatus nevertheless reacts much too sluggishly for a large number of applications, this being explained by the thermal inertia of the flow duct on the one hand and the low values for heat transmission in the direction of the measuring resistors on the other hand. It should be noted in this connection that all of the electrical parts have to be electrically insulated relatively to each other, and unfortunately good electrical insulators are, a rule, also good thermal insulators, i.e. inefficient thermal conductors. Because of the unavoidably great temperature gradients, this known apparatus is furthermore suitable only for use at relatively low temperatures (room temperature is mentioned the publication).

The object of the present invention is, therefore, to provide a mass flow-meter operating o the anemometers principle which, while responding promptly to different mass flows and temperatures, is able to resist corrosive gases and/or gases at a high temperature.

According to the invention and in the case of the initially described mass flow-meter, this object is achieved by means of the following features:

(a) the temperature-dependant measuring resistors consist of a thin-film resistor which is arranged on a ceramic insulating member (b) the thin-film resistor together with the insulating member is connected to a ceramic support member by way of a glass solder element, and (c) the support member is in turn in sealed connection with the flow duct either directly or indirectly by way of a glass solder element.

The features in accordance with the invention result in a mass flow-meter which is exposed as far as possible to the medium to be measured but without the actual resistor film being directly exposed to what might be a corrosive medium. The film is protected at one side by the ceramic insulating member on which it is deposited, and on the other side by the glass solder element whereby the thin-film resistor is connected to the ceramic support member. Both the ceramic insulating member and the glass solder element are sufficiently thin, i.e. have a sufficiently great thermal conductivity for keeping the time constant of the resistor sufficiently short.

If only one of the measuring resistors is arranged in the flow cross-section, this will be the resistor that supplies the actual measuring signal. The effects of the edges of the flow duct, particularly those resulting from the thermal inertia of the duct, are completely eliminated. The ceramic support member prevents the measurement from being appreciably influenced by the conduction of heat from the exterior of the flow duct. This support member is also connected in a leak free manner to the flow duct by way of a glass solder element, so that adequate thermal and electrical insulation accompanied by great resistance to corrosion is ensured. The connection can be achieved indirectly or directly, i.e. the ceramic support member can be connected, by way of the glass solder element, to a hollow screw-threaded plug which is inserted in the flow duct; alternatively, the support member can be directly connected by the glass solder element to the wall of the flow duct.

Thin-film measuring resistors, which are known per se in connection with the measurement of temperature, have not hitherto been used for anemometers or mass flow measurement; in particular, they have not been heated, by passing a current directly through them, to a temperature that forms the basis of the anemometer principle.

The slightly differing advantages provided by the various forms of construction are explained in the detailed description by means of graphs.

At this point it suffices to say that there are two important possible methods of making the connection with the glass solder element. First, when the insulating member faces outwards, the thin-film resistor can be connected to the end-face of the support member by way of the glass solder element so that the thin-film resistor is completely covered and protected by the insulating member, whereas protection at the sides is provided by the glass solder element. Such possible arrangement is illustrated in FIG. 1. Alternatively, when the thin-film resistor faces outwards, the insulting member can be connected, by way of the glass solder element, to the end-face of the ceramic tube, and for the purpose of protecting the thin-film resistor, use is made of the glass solder element which also wets this resistor. Such possible arrangement forms the subject-matter of FIG. 2.

Figure 2:
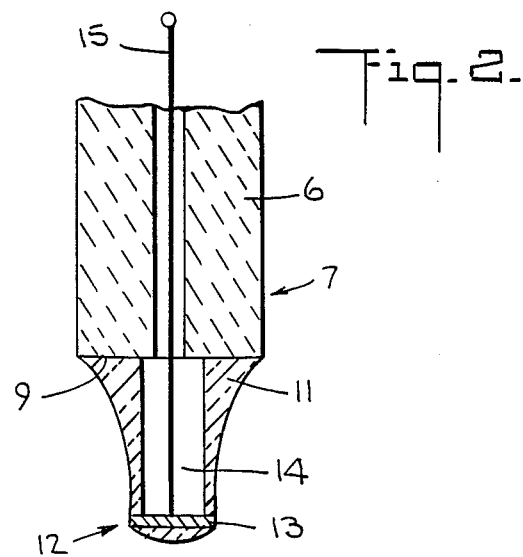
Figure 3:
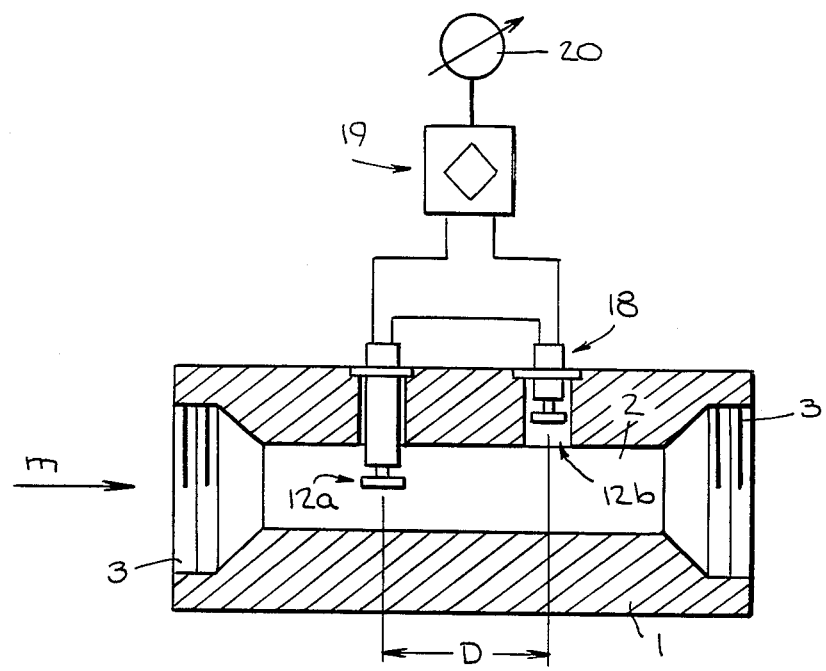
Figure 4:
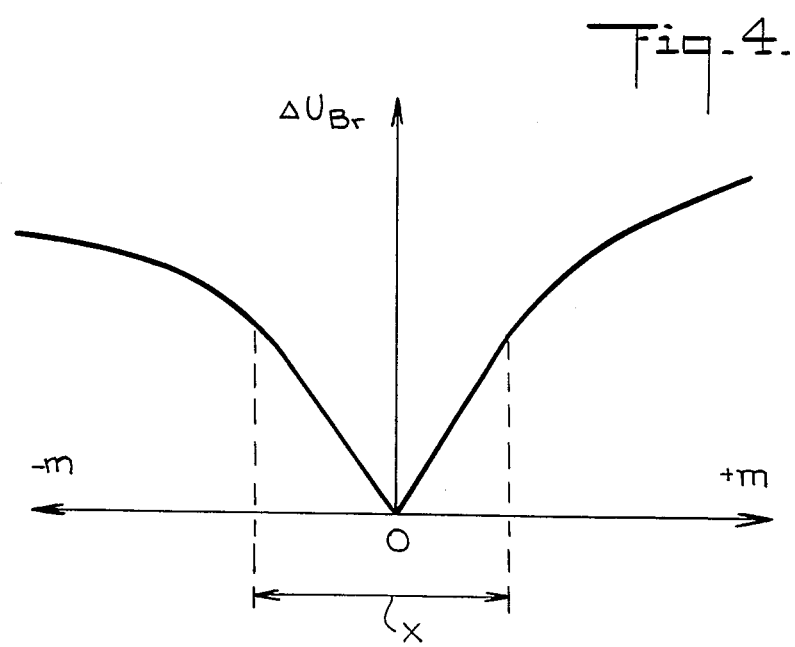
Figure 5:
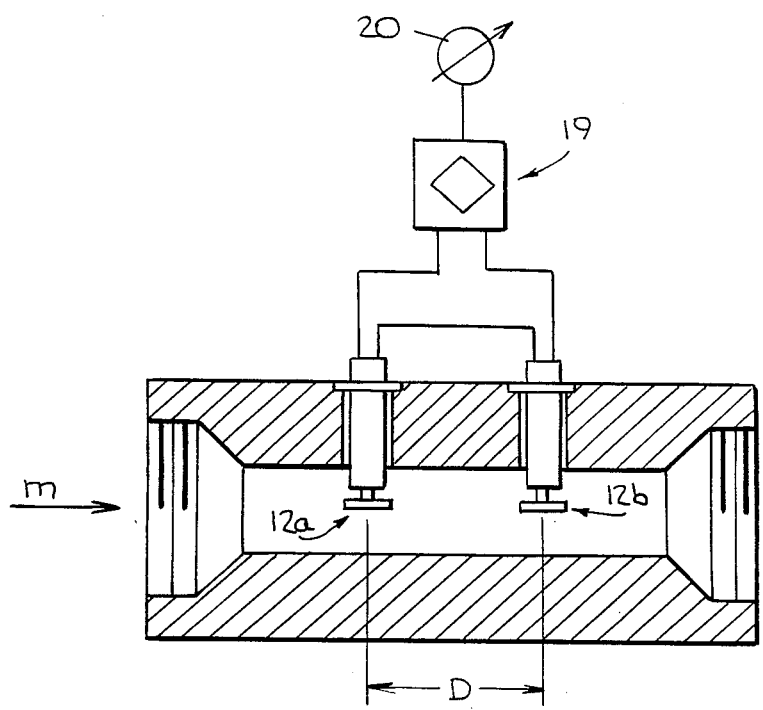
Figure 6:
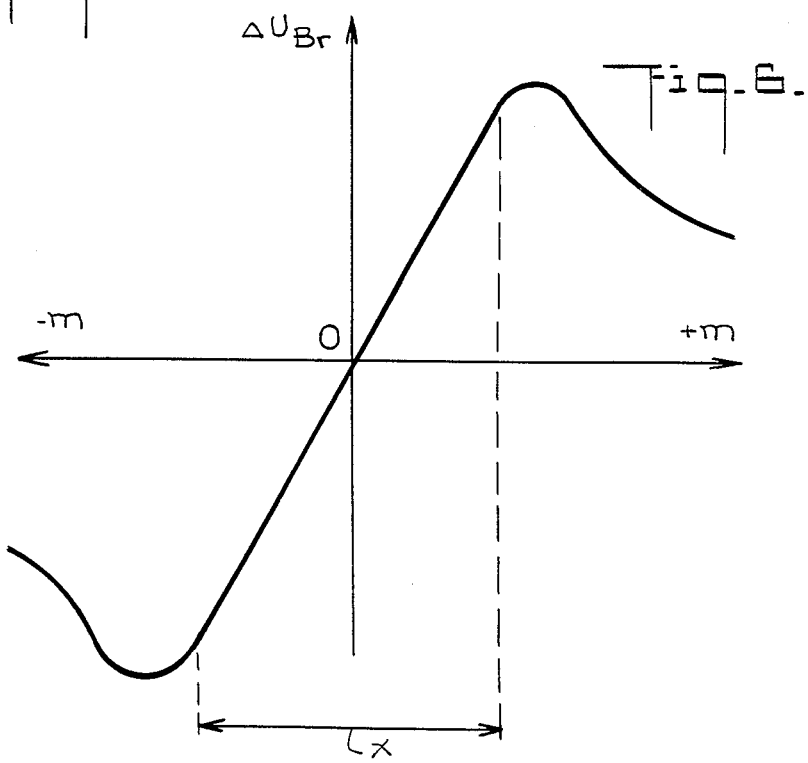
Figure 7:
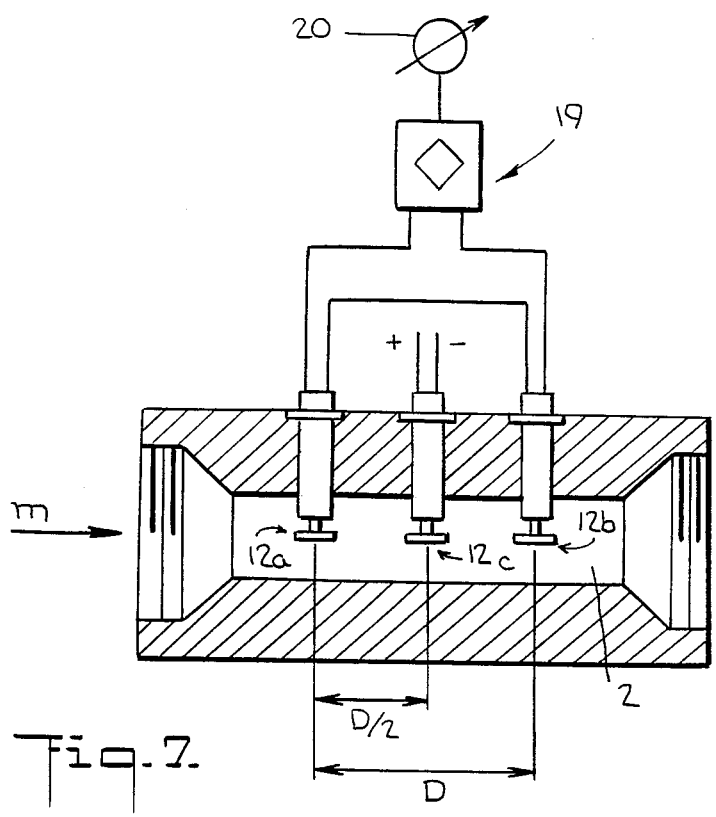
Figure 8:
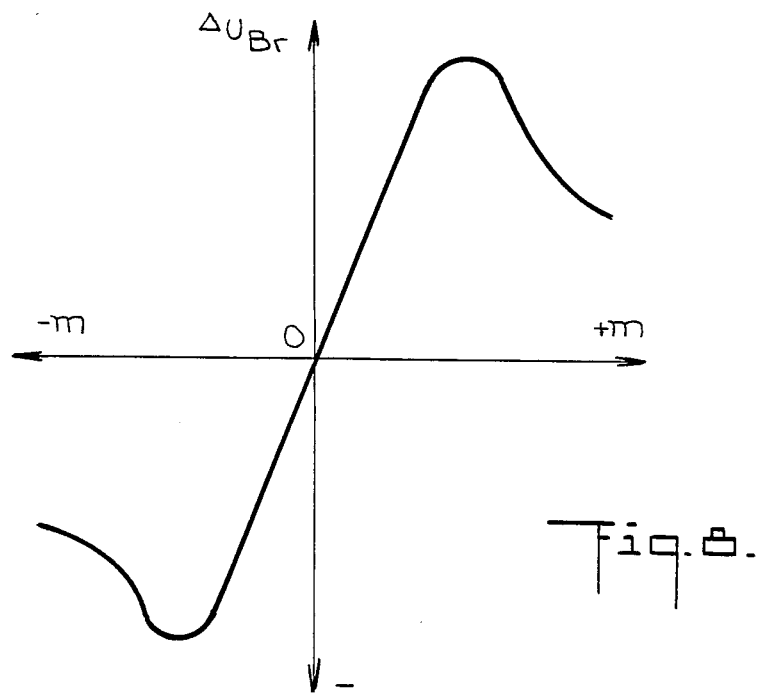

Examples of forms of construction and of possible variants of the subject-matter of the invention will now be described in greater detail by reference to FIGS. 1 to 8, in which:

FIGS. 1 and 2 show different forms of the measuring sensor itself in relation to the arrangement of the ceramic insulating member with the thin-film resistor relatively to the support element, FIGS. 3, 5 and 7 illustrate different possible ways of fitting the measuring sensors of FIGS. 1 and 2 in a flow duct, and FIGS. 4, 6 and 8 are graphs relating to the measuring arrangements shown in FIGS. 3, 5 and 7.

FIG. 1 illustrates a portion of a wall of a flow duct 1 which, as shown in FIGS. 3, 5 and 7, takes the form of a length of cylindrical tubing having a longitudinal bore 2 and an axis A—A, so that the maximum flow rate occurs along said axis A—A. At each of its ends, the longitudinal bore 2 has screw-threaded portions 3 for the connection of suitable tubes. The direction of flow is indicated in FIGS. 3, 5 and 7 by an arrow m which designates the mass stream. The material for the flow duct is a metal selected from the group containing nickel, high-nickel alloys (Hastelloy C; Monel), tantalum and titanium, and said duct is preferably of thick-walled construction.

The flow duct 1 has a radial bore 4 with a stepped recess 5, the function of which will be described later. Inserted in the bore 4 is a support member 6 having a cylindrical outer surface 7 and two flat end-faces 8 and 9 disposed at right angles to the axis of the support member, which is made of a resistant ceramic material, for example, industrial porcelain. In the zone of the recess 5, the outer surface 7 is connected to the flow duct 1 by way of a glass solder element 10, and the inner end-face 9 is connected, likewise by way of a glass solder element 11, to a measuring resistor 12, which consists of a thin-film resistor 13 and a ceramic insulating member 14, on which the thin-film resistor 13 will have ben previously undetachably applied by one of the usual coating processes (vacuum vapour deposition, cathodic evaporization). The thin-film resistor is made of platinum, and the insulating member 14 has an area of approximately 4 mm$^2$. Running to the thin-film resistor 13 are two electric leads 15, which pass through suitable axially parallel bores, not illustrated, in the support member 6. The leads 15 extend to terminals 16 nd 17, so that the thin-film resistor 13 can be switched into the branch of a measuring bridge.

The measuring resistor 12 lies in the zone of the axis A—A and is spaced from the inner end-face 9 by a distance of approximately 2 mm, though this is not particularly critical. This space is filled with the above-described glass solder element, the measuring resistor 12 as well as the end-face 9 being well wetted, so that the thin-film resistor 13 is protected all round by ceramic or mineral material. The glass solder in fact penetrates to some extent into the axially parallel bores formed in the support member 6, but this is not illustrated so as to keep the drawing simple.

The glass solder that is preferred is a lead borate glass that is produced by Messrs. Schott Glaswerke in Mainz (Federal Republic of Germany), is marketed under the glass number 84 72 and forms an excellent heat-resisting bond with the parts to be connected. The soldering temperature is 410° C.; the fatigue limit occurs at a temperature of approximately 300° C.

Parts shown in FIG. 2 that have their equivalents in FIG. 1 carry the same reference symbols as in the latter Figure. In the FIG. 2 arrangement, however, the measuring resistor 12 is arranged on edge, i.e. the thin-film resistor 13 is provided on a narrow end-face of the insulating member 14 and the latter bears directly on the end-face 9 of the support member 6. The glass solder element 11 (of the same kind of material) covers the entire free faces of the measuring resistor 14, i.e. inclusive of the thin-film resistor 13, a good wetting action occurring. The thin-film resistor 13 is thus exposed to the flowing measuring medium in a more direct manner than in the case of the FIG. 1 arrangement, and at the same time the thermal effect by way of the support member 6 is further inhibited.

As shown in FIG. 3, two measuring resistors 12a and 12b are separated in the axial direction by a distance D. One of these resistors (the resistor 12a) is arranged within the flow cross-section (preferably in the zone of the axis A—A), and the other (12b) is fitted in a bind-end hole 18 outside the flow cross-section. Thus, the measuring resistor 12a is subjected to the flow and the temperature of the moving medium, whereas the measuring resistor 12b is subjected only to the temperature of the medium. The measuring resistor 12b to some extent "sees" the temperature of the medium. The two measuring resistors are heated to a specific temperature $T_1$ by means of a constant bridge voltage $U_{Br}$. Without a mass flow (m=0), the two sensors acquire the same temperature and therefore the same resistances, so that the difference in the bridge voltage $\Delta U_{Br}$ is likewise 0. Flow then alters the temperature of the measuring resistor 12a, which is located in the flow, whereas the measuring resistor 12b maintains its temperature due to the fact that it is fitted in a blind-end hole. The resultant detuning of a measuring bridge 19 is then proportional to the mass flow m and can be displayed by means of an indicating instrument 20.

FIG. 4 shows the graph relating to the FIG. 3 arrangement and for both directions of flow. The positive part of the abscissa represents the direction of flow indicated by the arrow m in FIG. 3, whereas the negative part of the abscissa —m represents the reversed direction of flow (flow reversal). It will be seen on the one hand that the difference in bridge voltage $\Delta U_{Br}$ does not enable the direction of flow to be detected. On the other hand (in contrast to the graphs in FIGS. 6 and 8), completely clear graphs are obtained which exhibit no maxima or minima, so that a clear mass flow can always be determined. The linear zone is indicated by the letter x; it is generally used for the normal measurements. It is of course possible, by means of a microprocessor control arrangement, to introduce correcting values for the non-linear part of the graphs, so that this part can also be used for measuring purposed, for example, in the high velocity range.

In the form of construction shown in FIG. 5, the two measuring resistors 12a and 12b are arranged in the flow cross-section, i.e. along the axis A—A of the longitudinal bore 2. In these cases too, the two measuring resistors are heated by passing current directly through them, and the bridge circuit 19 is identical to that shown in FIG. 3. Without mass flow (m=0), the measuring voltage $\Delta U_{Br}$ is likewise 0. The upstream measuring resistor 12a is now cooled by a mass flow, whereas the downstream measuring resistor 12b is additionally heated up by the transmission of heat. The resultant change in resistance can likewise by displayed by way of the measuring bridge 19 and the indicating instrument 20. In this case, a change in resistance alters its sign when flow is reversed, i.e. a negative measuring voltage is also produced in the zone of the negative part of the abscissa. In this case, use can be made only of the linear zone shown in FIG. 6, which indicates that the graph exhibits a maximum and a minimum outside the linear zone, so that the measuring voltage acquires a double significance. On the other hand, recognition of the direction of flow can be important in certain applications, so that this arrangement also has its advantages. The rise in the curve in the linear zone x can be varied by the axial distance D between the measuring resistors 12a and 12b.

In the arrangement shown in FIG. 7, two measuring resistors 12a and 12b are again arranged in the zone of the axis A—A of the longitudinal bore 2, i.e. in the flow cross-section; they are not, however, heated by the passage of current therethrough. Between the measuring resistors 12a and 12b, a third measuring resistor 12c is provided at a half-spacing position D/2 and likewise along the axis A—A, the construction of this third resistor being identical to that of the measuring resistors 12a and 12b. In this case, however, the measuring resistor 12c is used exclusively as a hot element, i.e. it is heated by passing current directly therethrough. As long as mass flow does not occur, the two measuring resistors 12a and 12b receive the same quantity of heat, and the indication is 0. When mass flow occurs, the upstream measuring resistor 12a is cooled, and the downstream measuring resistor 12b is heated by the transmission of heat, so that debuting of the measuring bridge 19 and a display at the indicating instrument 20 occurs.

The arrangement in accordance with FIG. 7 also results in a curve which is illustrated in FIG. 8 and which is substantially similar to that of FIG. 6. It will be seen that, on the one hand, the direction of flow can be determined, while on the other hand, the measured values have a double significance outside of the linear range.

Fields of application that can be considered are the chemical and power-supply industries, in which it is necessary to determine the mass flow of corrosive media at high temperature as accurately as possible. The letter m designates the mass flow, that is to say dm/dt.

We claim:

1. A thermal mass flow-meter comprising:
   a flow duct having a flow cross-section;
   at least two temperature -dependent measuring resistors which are exposed to the flow medium and at least one of which is arranged in the flow cross-section;
   analyzing circuit means for converting the resistance values into amounts proportional to flow;
   a ceramic insulating member, said temperature-dependent measuring resistors comprising a thin-film resistor on said ceramic insulating member;
   a ceramic support member;
   means including glass solder for connecting said thin-film resistor to said ceramic support member, at least one of said insulating member and said glass solder protectively covering the entirety of said thin-film resistor from the flow medium; and
   means including glass solder for providing a sealed connected between said ceramic support member and said flow duct,
   said support member being a ceramic tube with a flat end-face and, with said insulating member directed outwardly of said flow duct and parallel to said flat end face at a distance with a space therefrom, said thin-film resistor being connected by glass solder to said end-face in such manner that the last mentioned glass solder completely fills the space between the thin-film resistor and the end-face.

2. A thermal mass flow-meter comprising:

a flow duct having a flow cross-section;

at least two temperature-dependent measuring resistors which are exposed to the flow medium and at least one of which is arranged in the flow cross-section;

analyzing circuit means for converting the resistance values into amounts proportional to flow;

a ceramic insulating member, said temperature-dependent measuring resistors comprising a thin-film resistor on said ceramic insulating member;

a ceramic support member;

means including glass solder for connecting said thin-film resistor to said ceramic support member, at least one of said insulating member and said glass solder protectively covering the entirety of said thin-film resistor from the flow medium; and means including glass solder for providing a sealed connection between said ceramic support member and said flow duct, said support member being a ceramic tube with a flat end-face, and, with said thin-film resistor being directed outwardly of said flow duct and parallel to said flat end face at distance with a space therefrom, said insulating member being connected to the end-face by glass solder.

* * * * *